(12) United States Patent
Bertoldi et al.

(10) Patent No.: US 10,823,409 B2
(45) Date of Patent: Nov. 3, 2020

(54) VOID STRUCTURES WITH REPEATING ELONGATED-APERTURE PATTERN

(71) Applicants: PRESIDENT AND FELLOWS OF HARVARD COLLEGE, Cambridge, MA (US); ROLLS-ROYCE CANADA, LTD., Lachine Montreal (CA)

(72) Inventors: Katia Bertoldi, Somerville, MA (US); Michael Taylor, Medford, MA (US); Ali Shanian, Montreal (CA); Miklos Gerendas, Mellensee (DE); Carl Carson, Beaconsfield (CA)

(73) Assignees: President and Fellows of Harvard College, Cambridge, MA (US); Rolls-Royce Canada, Ltd., Montreal (CA)

( * ) Notice: Subject to any disclaimer, the term of this patent is extended or adjusted under 35 U.S.C. 154(b) by 1087 days.

(21) Appl. No.: 14/776,494

(22) PCT Filed: Mar. 13, 2014

(86) PCT No.: PCT/US2014/025324
§ 371 (c)(1),
(2) Date: Sep. 14, 2015

(87) PCT Pub. No.: WO2014/197059
PCT Pub. Date: Dec. 11, 2014

(65) Prior Publication Data
US 2016/0025343 A1 Jan. 28, 2016

Related U.S. Application Data

(60) Provisional application No. 61/790,175, filed on Mar. 15, 2013.

(51) Int. Cl.
*B32B 3/24* (2006.01)
*F23R 3/00* (2006.01)
(Continued)

(52) U.S. Cl.
CPC .............. *F23R 3/002* (2013.01); *B23K 15/08* (2013.01); *B23K 26/38* (2013.01); *F23R 3/06* (2013.01);
(Continued)

(58) Field of Classification Search
CPC ....................... Y10T 428/24339; B32B 3/266
See application file for complete search history.

(56) References Cited

U.S. PATENT DOCUMENTS

| | | |
|---|---|---|
| 3,655,501 A | 4/1972 | Tesch |
| 5,233,828 A | 8/1993 | Napoli |

(Continued)

FOREIGN PATENT DOCUMENTS

| | | |
|---|---|---|
| CN | 101105189 A | 1/2008 |
| CN | 102062078 A | 5/2011 |

(Continued)

OTHER PUBLICATIONS

International Search Report, PCT/US2014/025324, dated Nov. 18, 2014, 2 pages.

(Continued)

*Primary Examiner* — William P Watkins, III
(74) *Attorney, Agent, or Firm* — Nixon Peabody LLP

(57) ABSTRACT

Void structures, systems and devices with void structures, and methods of fabricating void structures are disclosed. A void structure is disclosed with a repeating elongated-aperture pattern designed to provide negative Poisson's Ratio behavior under macroscopic stress and strain loading. The pattern can include horizontal and vertical elliptically shaped apertures that are arranged on horizontal and vertical (Continued)

lines in a way that the lines are equally spaced in both dimensions. The centers of each aperture is on a crossing point of two of the lines. The vertical and horizontal elliptically shaped apertures alternate on the vertical and horizontal lines such that any vertical aperture is surrounded by horizontal apertures along the lines (and vice versa), and the next vertical apertures are found on both diagonals. The voids can also act as cooling and/or damping holes and, due to their arrangement, also as stress reduction features.

8 Claims, 4 Drawing Sheets

(51) Int. Cl.
*F23R 3/06* (2006.01)
*B23K 15/08* (2006.01)
*B23K 26/38* (2014.01)
*B32B 3/26* (2006.01)

(52) U.S. Cl.
CPC .... *B32B 3/266* (2013.01); *F23M 2900/05004* (2013.01); *F23R 2900/00005* (2013.01); *Y10T 428/24314* (2015.01)

(56) References Cited

U.S. PATENT DOCUMENTS

| | | |
|---|---|---|
| 7,594,401 B1 | 9/2009 | Chen |
| 8,066,482 B2 | 11/2011 | Strohl |
| 2007/0122590 A1 | 5/2007 | Lalvani |
| 2007/0135788 A1* | 6/2007 | Damay ............ A61F 13/47236 604/385.01 |
| 2009/0041978 A1 | 2/2009 | Sogard |
| 2010/0009120 A1 | 1/2010 | Boyce |
| 2010/0129213 A1 | 5/2010 | Strohl |
| 2011/0023496 A1 | 2/2011 | Bastnagel |
| 2011/0054514 A1 | 3/2011 | Arcand |
| 2011/0059291 A1 | 3/2011 | Boyce |
| 2016/0025344 A1* | 1/2016 | Bertoldi .................. B32B 3/10 428/613 |

FOREIGN PATENT DOCUMENTS

| | | |
|---|---|---|
| CN | 202082156 U | 12/2011 |
| CN | 102472169 A | 5/2012 |
| EP | 0 486 226 A1 | 5/1992 |
| EP | 0 971 172 A1 | 1/2000 |
| EP | 1873387 A2 | 1/2008 |
| FR | 2941287 A1 | 7/2010 |
| JP | H4-283315 A | 10/1992 |
| JP | 2009-250242 A | 10/2009 |
| JP | 2010-517625 A | 5/2010 |
| RU | 2162194 C1 | 1/2001 |
| RU | 2443943 C2 | 2/2012 |
| RU | 121347 U1 | 10/2012 |
| WO | WO 2014/197059 A1 | 12/2014 |

OTHER PUBLICATIONS

Written Opinion of the International Searching Authority, PCT/US2014/025324, dated Nov. 18, 2014, 4 pages.

* cited by examiner

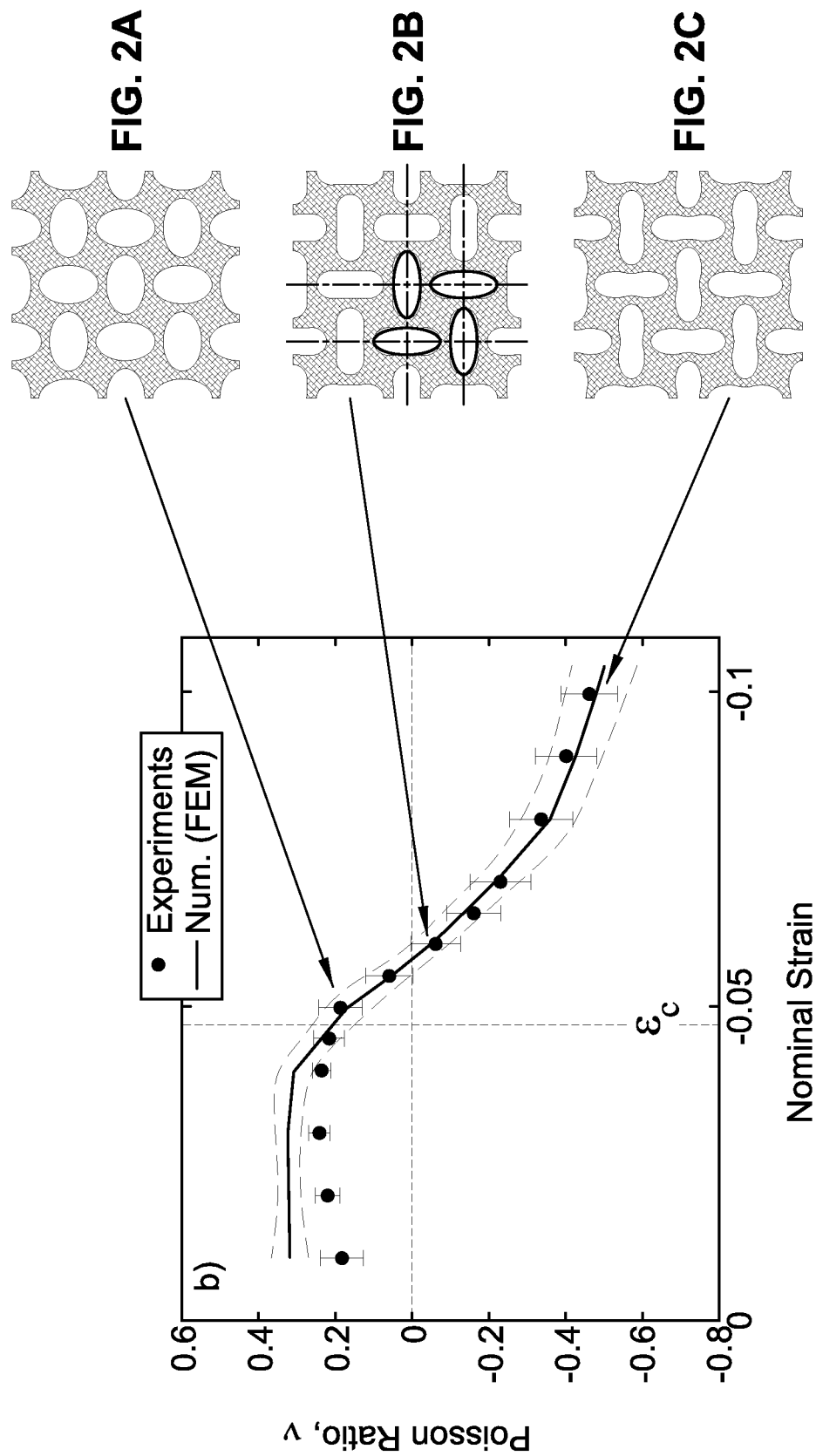

VOID STRUCTURES WITH REPEATING ELONGATED-APERTURE PATTERN

CROSS-REFERENCE AND CLAIM OF PRIORITY TO RELATED APPLICATIONS

This application is a U.S. National Phase of International Application No. PCT/US2014/025324, which was filed on Mar. 13, 2014, and claims the benefit of priority to U.S. Provisional Patent Application No. 61/791,175, which was filed on Mar. 15, 2013, both of which are incorporated herein by reference in their entireties and for all purposes.

TECHNICAL FIELD

The present disclosure relates generally to void structures and cellular solids. More particularly, aspects of this disclosure relate to materials possessing a repeating-aperture pattern that leads to unusual mechanical properties, such as negative Poisson's Ratio, as well as systems, method and devices using such materials.

BACKGROUND

When materials are compressed along a particular axis they are most commonly observed to expand in directions orthogonal to the applied load. The property that characterizes this behavior is the Poisson's Ratio, which can be defined as the ratio between the negative transverse and longitudinal strains. The majority of materials are characterized by a positive Poisson's Ratio, which is approximately 0.5 for rubber and 0.3 for glass and steel. Materials with a negative Poisson's Ratio will contract (or expand) in the transverse direction when compressed (or stretched) and, although they can exist in principle, demonstration of practical examples is relatively recent. Materials that exhibit negative Poisson's Ratio behavior are oftentimes referred to as "auxetics". The results of many investigations suggest that the auxetic behavior involves an interplay between the microstructure of the material and its deformation. Examples of this are provided by the discovery that metals with a cubic lattice, natural layered ceramics, ferro-electric polycrystalline ceramics, and zeolites may all exhibit negative Poisson's Ratio behavior. Moreover, several geometries and mechanisms have been proposed to achieve negative values for the Poisson's Ratio, including foams with reentrant structures, hierarchical laminates, polymeric and metallic foams. Negative Poisson's Ratio effects have also been demonstrated at the micrometer scale using complex materials which were fabricated using soft lithography and at the nanoscale with sheets assemblies of carbon nanotubes.

A significant challenge in the fabrication of materials with auxetic properties is that it usually involves embedding structures with intricate geometries within a host matrix. As such, the manufacturing process has been a bottleneck in the practical development towards applications. A structure which forms the basis of many auxetic materials is that of a cellular solid and research into the deformation of these materials is a relatively mature field with primary emphasis on the role of buckling phenomena, on load carrying capacity, and energy absorption under compressive loading. Very recently, the results of a combined experimental and numerical investigation demonstrated that mechanical instabilities in 2D periodic porous structures can trigger dramatic transformations of the original geometry. Specifically, uniaxial loading of a square array of circular holes in an elastomeric matrix is found to lead to a pattern of alternating mutually orthogonal ellipses while the array is under load. This results from an elastic instability above a critical value of the applied strain. The geometric reorganization observed at the instability is both reversible and repeatable and it occurs over a narrow range of the applied load. Moreover, it has been shown that the pattern transformation leads to unidirectional negative Poisson's Ratio behavior for the 2D structure, i.e., it only occurs under compression.

U.S. Pat. No. 5,233,828 ("828 Patent"), to Phillip D. Napoli, shows an example of an engineered structural member—a combustor liner—utilized in high temperature applications. Combustor liners are generally used in the combustion section of a gas turbine. Combustor liners can also be used in the exhaust section or in other sections of or components of the gas turbine, such as the turbine blades. In operation, the combustors burn gas at intensely high temperatures, such as around 3,000° F. or higher. To prevent this intense heat from damaging the combustor before it exits to a turbine, the combustor liner is provided in the interior of the combustor to insulate the surrounding engine. To minimize temperature and pressure differentials across the combustor liners, cooling slots have conventionally been provided, such as is shown in '828 Patent. The '828 Patent shows a portion of an annular combustor liner having spaced cooling holes disposed in a continuous pattern, angled through the wall of the liner. As another example, U.S. Pat. No. 8,066,482 B2, to James Page Strohl et al., shows another example of an engineered structural member having shaped cooling holes to enhance the cooling of a desired region of a gas turbine and to reduce stress levels in and around the cooling holes. European Patent No. EP 0971172 A1, to Dr. Jakob Keller, likewise shows another example of a perforated liner used in a combustion zone of a gas turbine. In yet another example, U.S. Patent Application Pub. No. 2010/0009120 A1, to Mary C. Boyce et al., discloses a number of transformative periodic structures which include elastomeric or elasto-plastic periodic solids that experience transformation in the structural configuration upon application of a critical macroscopic stress or strain. All of the foregoing patent documents are incorporated herein by reference in their respective entireties for all purposes.

SUMMARY

Aspects of the present disclosure are directed towards void structures with repeating elongated-aperture patterns that provide negative Poisson's Ratio behavior (also known as "auxetic materials"). Guided by the collapsed-void shapes found in rubber specimens under external load, further aspects are directed to materials with void shapes that are generated in a stress-free state in order to achieve negative Poisson's Ratio behavior in the material without collapsing the material in manufacturing. Other aspects of the present disclosure are directed to multi-functional air passages in the hot section of a gas turbine. Additional aspects are directed towards gas turbine combustors that are made with walls from a material with a specific void structure that provides particular thermal, damping and/or acoustic functionalities. Such functionalities include, for example, acoustic attenuation (or noise damping), stress reduction (or load damping), and thermal cooling (or heat damping).

According to one aspect of the present disclosure, a void structure is disclosed. The void structure includes a rigid or semi-rigid body with a first plurality of first elongated apertures and a second plurality of second elongated apertures. Each of the elongated apertures has a major axis and a minor axis. The major axes of the first elongated apertures are perpendicular to the major axes of the second elongated apertures. The first and second pluralities of elongated apertures are arranged in an array of rows and columns. Each of the rows and each of the columns alternate between the first and the second elongated apertures. That is, each row and each column may include 100 apertures—50 vertically oriented apertures that are interspersed with 50 horizontally oriented apertures. The apertures are cooperatively configured to achieve negative Poisson's Ratio behavior under stress or strain, or both.

Other aspects of the present disclosure are directed to a method of manufacturing a void structure. The method includes: providing a rigid or semi-rigid body; and adding first elongated apertures and second elongated apertures into the rigid or semi-rigid body. Each of the elongated apertures has a major axis and a minor axis. The major axes of the first elongated apertures are perpendicular to the major axes of the second elongated apertures. The elongated apertures are arranged in an array of rows and columns. Each of the rows and each of the columns alternates between the first and the second elongated apertures. The apertures are cooperatively configured to achieve negative Poisson's Ratio behavior under stress or strain, or both. The first and second elongated apertures can be added into the rigid or semi-rigid body in any known manner, including via microfabrication, interference lithography, laser cutting, or electron-beam cutting, or any combination thereof.

In accordance with another aspect of this disclosure, a gas turbine combustor is disclosed. The gas turbine combustor includes a metallic wall with a plurality of vertically elongated apertures and a plurality of horizontally elongated apertures. Each of the elongated apertures has a major axis that is perpendicular to a minor axis. The major axes of the vertically elongated apertures are perpendicular to the major axes of the horizontally elongated apertures. The elongated apertures are arranged in an array of equidistant rows that are perpendicular to equidistant columns. Each of the rows and each of the columns alternates between the vertically and the horizontally elongated apertures. The elongated apertures have a predetermined porosity and a predetermined aspect ratio that are cooperatively configured to achieve negative Poisson's Ratio behavior under macroscopic stress and strain loadings.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and modes for carrying out the present invention when taken in connection with the accompanying drawings and the appended claims.

BRIEF DESCRIPTION OF THE DRAWINGS

FIG. 1 is a graph of Poisson's Ratio against Strain illustrating the negative Poisson's Ratio behavior of various representative void structures according to aspects of the present disclosure.

FIGS. 2a-2c are images of three different square arrays of elliptical voids demonstrating different negative Poisson's Ratio behavior according to aspects of the present disclosure.

Figure 3:
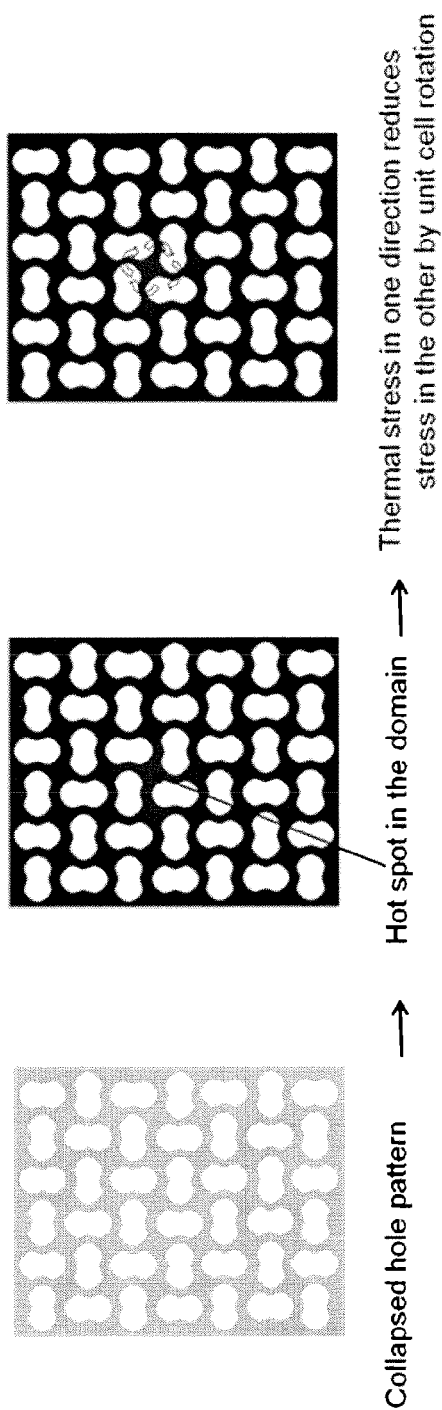
FIG. 3 provides three time-sequenced images of a square array of collapsed-hole voids reducing the thermal stresses caused by a hot spot in the domain according to aspects of the present disclosure.
Figure 5:
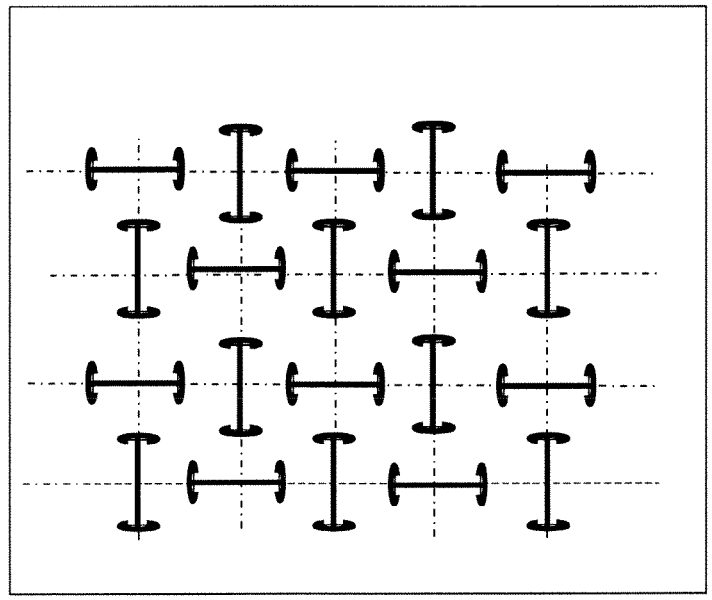
FIG. 5 is an image of a square array of horizontally and vertically aligned double-T shaped apertures in a stress-free state that provides negative Poisson's Ratio behavior in accordance with aspects of the present disclosure.
Figure 4:
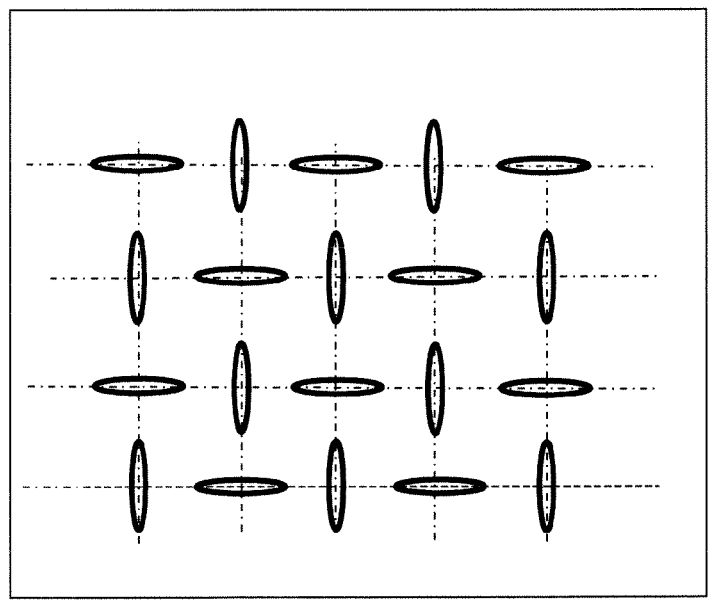
FIG. 4 is an image of a square array of horizontally and vertically aligned elliptically shaped apertures in a stress-free state that provides negative Poisson's Ratio behavior in accordance with aspects of the present disclosure.

While aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

This invention is susceptible of embodiment in many different forms. There are shown in the drawings and will herein be described in detail representative embodiments of the invention with the understanding that the present disclosure is to be considered as an exemplification of the principles of the invention and is not intended to limit the broad aspects of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Aspects of the present disclosure are directed towards void structures which, in a steady-state environment sans macroscopic loading, include repeating elongated-aperture patterns that provide negative Poisson's Ratio (NPR) behavior. Poisson's Ratio (or "Poisson coefficient") can be generally typified as the ratio of transverse contraction strain to longitudinal extension strain in a stretched object. Poisson's Ratio is generally positive since most materials, including many polymer foams and cellular solids, become thinner in cross section when stretched. The void structures disclosed herein exhibit a negative Poisson's Ratio behavior. These types of materials are also referred to as being "auxetic" or as "auxetic materials".

In some of the disclosed embodiments, when the structure is compressed in the Y direction, because of the way the adjacent apertures are arranged, the Y-direction strain results in a moment around the center of each cell, causing the cells to rotate. Each cell rotates in a direction opposite to that of its immediate neighbors. This rotation results in a reduction in the X-direction distance between horizontally adjacent cells. In other words, compressing the structure in the Y direction causes it to contract in the X direction. Conversely, tension in the Y direction results in expansion in the X direction. At the scale of the entire structure, this mimics the behavior of an auxetic material. But many of the structures disclosed herein are composed of conventional materials. The "pseudo-auxetic" behavior is an emergent property of the structure. Put another way, the material itself may have a positive Poisson's Ratio, but by modifying the structure with the introduction of the elongated-aperture patterns disclosed herein, the structure microscopically behaves as having a negative Poisson's Ratio.

FIG. 1 is a graph of Poisson's Ratio against Strain illustrating the Poisson's Ratio behavior of three representative void structures shown in FIGS. 2a-2c. The chart of FIG. 1 shows the Poisson Ratio (PR) of a test piece under load. At a certain level of deformation the "instantaneous" PR can be determined and plotted against a parameter (e.g., nominal strain) representing the level of deformation. When a designer has a desired NPR for an intended application, the level of deformation corresponding to that PR can be looked up and the geometry of the holes at that condition determined. This hole shape pattern can then be machined (manufactured) on an unstressed part to achieve a component with the desired PR.

As seen in FIGS. 2b and 2c, the NPR elongated-aperture patterns can consist of horizontally oriented and vertically oriented elliptical holes (also referred to as "apertures" or "ellipses"). The ellipses are arranged on horizontal and vertical lines (e.g., rows and columns of a square array) in a way that the vertical lines are equally spaced and the horizontal in both dimensions lines are equally spaced (also $\Delta x=\Delta y$). The center of each aperture is on the crossing point of two of the lines. Horizontally oriented and vertically oriented ellipses alternate on the vertical and horizontal lines such that any vertical ellipse is surrounded by horizontal ellipses along the lines (and vice versa), while the next vertical ellipses are found on both diagonals. The voids can also act as cooling and/or damping holes and, due to their arrangement, also as stress reduction features.

Also disclosed is a gas turbine combustor that is made with walls from a material with any of the specific void structures disclosed herein. In some embodiments, the aperture shapes are generated in a metal body directly in a stress-free state such that the apertures are equivalent in shape to collapsed void shapes found in rubber under external load in order to get negative Poisson's Ratio behavior in the metal without collapsing the metallic structure in manufacturing. Various manufacturing routes can be used to replicate the void patterns in the metallic component. The manufacturing does not necessarily contain buckling as one of the process steps. The void structures disclosed herein are not limited to the combustor wall; rather, these features can be incorporated into other sections of a turbine (e.g., a blade, a vein, etc.).

If the porosity of a single sheet is judged to be too high for a specific combustor application, two or more sheets are stacked in an offset manner in order to have the optimum void fraction of the single sheet to get the intended behavior and to have the optimum air flow through the sheet in order to get the intended level of cooling and/or damping. For example, two sheets with the same (or a similar) pattern of apertures can be juxtaposed such that the apertures are aligned (e.g., have a common central axis) or intentionally misaligned (e.g., central axes of adjacent apertures are radially offset) to cooperatively achieve a desired thermal, mechanical, and/or acoustic function.

The combustor wall has an advantageous behavior of an appeared (macroscopic) negative Poisson's Ratio. Even when this structure is made from conventional metal, it will contract in a lateral direction when it is put under an axial compressive load, without the material itself being made from a material having a negative Poisson's Ratio. The behavior is triggered by the specific void structure.

In a conventional combustor wall, the holes used for providing cooling air flow and damping also act as stress risers. In some of the disclosed embodiments, as the wall material at a hot spot presses against its surrounding material, e.g., in a vertical direction, the negative Poisson's Ratio will make the wall material contract in the horizontal direction, and vice versa. This behavior will reduce the stresses at the hotspot significantly. This effect is stronger than just the impact of the reduced stiffness. Stress at hot spot gets reduced by 50% leading to an increase in stress fatigue life by several orders of magnitude. The stress reduction by the NPR behavior does not increase the air consumption of the combustor wall. The longer life could be used as such or the wall material could be replaced by a cheaper one in order to reduce cost significantly.

We also have demonstrated that the replacement of circular combustor cooling holes with a fraction of elliptical air passages of 2-3% reduces thermo-mechanical stress by a factor of at least five, while maintaining the cooling and damping performance. For example, elliptical cooling holes in the combustor have been predicted to result in a five-fold decrease in the worst principal stress. By inducing NPR behavior, we have added a further functionality to our cooling holes. Five-fold reduction in worst principal stress resulting from modification of cooling holes to impart negative Poisson ratio behavior. In stress fatigue of a combustor-specific superalloy, halving the component stress increases the fatigue life by more than an order of magnitude. In some embodiments, the superalloy may be a nickel-based superalloy, such as Inconel (e.g. IN100, IN600, IN713), Waspaloy, Rene alloys (e.g. Rene 41, Rene 80, Rene 95, Rene N5), Haynes alloys, Incoloy, MP98T, TMS alloys, and CMSX (e.g. CMSX-4) single crystal alloys.

It has been shown that lower porosity offers increased cooling function. As used herein, "porosity" can be defined to mean the surface area of the apertures, $A_A$, divided by the surface area of the structure, $A_S$, or Porosity=$A_A/A_S$. It may be desirable, in some embodiments, that the porosity of a given void structure be approximately 1-4% or, in some embodiments, approximately 2-3% or, in some embodiments, approximately 2%. Many prior art arrangements require a porosity of 40-50%.

There may be a predetermined optimal aspect ratio for the elongated apertures to provide a desired NPR behavior. As used herein, "aspect ratio" of the apertures can be defined to mean the length divided by the width of the apertures, or the length of the major axis divided by the length of the minor axis of the apertures. It may be desirable, in some embodiments, that the aspect ratio of the apertures be approximately 5-40 or, in some embodiments, approximately 30-40. An optimal NPR can be, for example, −0.5. Aspects of the disclosed invention can be demonstrated on structural patterns created with a pattern lengthscale at the millimeter, and are equally applicable to structures possessing the same periodic patterns at a smaller lengthscale (e.g., micrometer, submicrometer, and nanometer lengthscales).

Figure 8:
FIGS. 6-8 illustrate different representative aperture shapes in accordance with aspects of the present disclosure.
Figure 7:
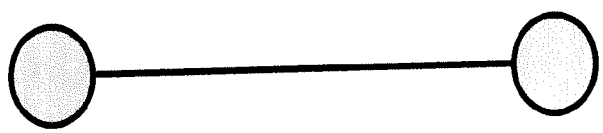
Figure 6:

The geometry of the apertures can take on a variety of shapes, sizes and orientations. FIGS. 2b and 2c illustrate the apertures taking on an elliptical form. FIG. 6 illustrates the apertures taking on an elliptical form with a higher aspect ratio than those shown in FIGS. 2a-2c. FIG. 3 illustrates the apertures taking on a collapsed-hole shape. FIG. 8 shows show the apertures taking on an I-shaped or double-T-shaped form. FIG. 7 illustrates the apertures taking on a barbell shape with two stop holes connected by a straight slot or stem. The shapes can be modified and/or evolved from one application to another. Moreover, these shapes can be changed due to the manufacturing process that is employed. The NPR behavior works with any configuration where the cells rotate in the manner described hereinabove.

While many embodiments and modes for carrying out the present invention have been described in detail above, those familiar with the art to which this invention relates will recognize various alternative designs and embodiments for practicing the invention within the scope of the appended claims.

What is claimed is:

1. A void structure comprising:
a rigid or semi-rigid body with a first plurality of first elongated apertures and a second plurality of second elongated apertures, each of the elongated apertures having a major axis and a minor axis, the major axes of the first elongated apertures being perpendicular to the major axes of the second elongated apertures, the first and second pluralities of elongated apertures being arranged in an array of rows and columns, each of the rows and each of the columns alternating between the first and the second elongated apertures, the elongated apertures being cooperatively configured to achieve negative Poisson's Ratio behavior under stress or strain, or both;
wherein each of the apertures is in the form of two spaced circular holes connected by a straight stem; and
wherein the elongated apertures are present in the rigid or semi-rigid body when in a stress-free state and have a predetermined porosity of approximately 1-4%.

2. The void structure of claim 1, wherein the body comprises a metallic wall.

3. The void structure of claim 1, wherein the major and minor axes of each of the elongated apertures are perpendicular.

4. The void structure of claim 1, wherein the rows are equally spaced from each other and the columns are equally spaced from each other.

5. The void structure of claim 1, wherein each of the elongated apertures includes a center at the intersection of the major and minor axes, the center of each of the elongated apertures being located at a respective intersection point of one of the rows and one of the columns of the array.

6. The void structure of claim 1, wherein the elongated apertures are cooperatively configured to provide predetermined thermal cooling and acoustic damping characteristics.

7. The void structure of claim 1, wherein the elongated apertures have a predetermined porosity and a predetermined aspect ratio that are cooperatively configured to achieve negative Poisson's Ratio behavior under macroscopic stress and strain loadings.

8. The void structure of claim 1, wherein each of the elongated apertures has an aspect ratio of approximately 5-40.

* * * * *